United States Patent [19]
Brown et al.

[11] 3,920,830
[45] Nov. 18, 1975

[54] INSECTICIDAL N-[(N'-ACYLAMIDO)THIO]ARYL CARBAMATES

[75] Inventors: Melacthon S. Brown; Gustave K. Kohn, both of Berkeley, Calif.

[73] Assignee: Chevron Research Company, San Francisco, Calif.

[22] Filed: Mar. 4, 1974

[21] Appl. No.: 447,799

Related U.S. Application Data

[62] Division of Ser. No. 54,854, July 14, 1970, Pat. No. 3,812,174.

[52] U.S. Cl. ............................................. 424/300
[51] Int. Cl.² ...................... A01N 9/12; A01N 9/20
[58] Field of Search................. 424/300; 260/479 C

[56] References Cited
UNITED STATES PATENTS
3,663,594   5/1972   Brown et al. ...................... 260/470

*Primary Examiner*—Albert T. Meyers
*Assistant Examiner*—Allen J. Robinson
*Attorney, Agent, or Firm*—J. A. Buchanan, Jr.; John Stoner, Jr.; Raymond Owyang

[57] ABSTRACT

Carbamates of the formula

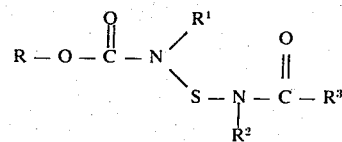

wherein R is aryl or aralkyl of 6 to 14 carbon atoms optionally substituted with halogen atoms, nitro groups, alkoxy groups, alkylthio groups or dialkylamino groups; $R^1$ is hydrogen or alkyl of 1 to 4 carbon atoms; $R^2$ is alkyl of 1 to 10 carbon atoms or cycloalkyl of 3 to 10 carbon atoms either being optionally substituted with halogen atoms; $R^3$ is hydrogen, alkyl of 1 to 10 carbon atoms or cycloalkyl of 3 to 10 carbon atoms, the alkyl or cycloalkyl being optionally substituted with halogen atoms with the proviso that $R^2$ and $R^3$ may be joined to form a linear alkylene radical of 3 to 5 carbon atoms which is bound to the carbonyl and nitrogen to form a ring, are used as insecticides.

20 Claims, No Drawings

INSECTICIDAL N-[(N'-ACYLAMIDO)THIO]ARYL CARBAMATES

This is a division of application Ser. No. 54,854, filed July 14, 1970, now U.S. Pat. No. 3,812,174.

BACKGROUND OF THE INVENTION

1. Field

The present invention is directed to N-[(N'-acylamido)thio] aryl carbamates. The carbamates find use as insecticides.

2. Description of the Invention

The N-[(N'-acylamido)thio] aryl carbamates of the present invention may be represented by the general formula:

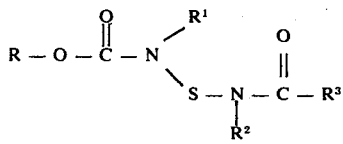

wherein R is aryl or aralkyl hydrocarbon of 6 to 14 carbon atoms, substituted with 0 to 4, preferably 0 to 2, halogen atoms of atomic number 9 to 35 (fluorine, chlorine or bromine), nitro groups, alkoxy groups of 1 to 7 carbon atoms, alkylthio of 1 to 3 carbon atoms; or 0 to 1 dialkylamino in which the alkyl groups contain individually 1 to 3 carbon atoms; $R^1$ is hydrogen or alkyl of 1 to 4 carbon atoms, $R^2$ is alkyl of 1 to 10 carbon atoms substituted with 0 to 4 halogen atoms of atomic number 17 to 35 (chlorine or bromine), cycloalkyl of 3 to 10 carbon atoms substituted with 0 to 4 halogen atoms of atomic number 17 to 35; $R^3$ is hydrogen or alkyl of 1 to 10 carbon atoms substituted with 0 to 4 halogen atoms of atomic number 17 to 35, cycloalkyl of 3 to 10 carbon atoms substituted with 0 to 4 halogen atoms of atomic number 17 to 35, with the proviso that $R^2$ and $R_3$ may be joined to form a linear alkylene radical of 3 to 5 carbon atoms which is bound to the carbonyl and nitrogen to form a ring. Preferably, the total number of substituents on the aromatic nucleus of R will not exceed 4. They may be the same or different.

Preferably R in the above formula is phenyl; phenyl substituted with 1 to 4 halogen atoms of atomic number 9 to 35 (fluorine, chlorine or bromine), nitro groups, alkyl groups of 1 to 7 carbon atoms, alkoxy groups of 1 to 7 carbon atoms, alkylthio of 1 to 3 carbon atoms; or 0 to 1 dialkylamino in which the alkyl groups contain individually 1 to 3 carbon atoms; naphthyl; or naphthyl substituted with 1 to 4 halogen atoms of atomic number 9 to 35, nitro groups, alkyl groups of 1 to 7 carbon atoms, alkoxy groups of 1 to 7 carbon atoms, alkylthio of 1 to 3 carbon atoms; or 0 to 1 dialkylamino in which the alkyl groups contain individually 1 to 3 carbon atoms. Preferably the alkyl groups substituted on the phenyl or naphthyl moieties will contain 1 to 5 carbon atoms and the alkoxy groups will contain 1 to 4 carbon atoms. The preferred halogen substituents on the phenyl and naphthyl moieties are chlorine and bromine. The naphthyl moiety is preferably bonded to the carbamate oxygen atom through the "1" or "2" carbon atoms.

Representative aryl or aralkyl groups which R may represent include phenyl, benzyl, biphenyl, naphthyl, chlorophenyl, bromophenyl, chloronaphthyl, ethylphenyl, methylphenyl, 2-chloro-4-methylphenyl, 3-chloronaphthyl, 3-sec.butylphenyl, 3-sec.pentylphenyl, 2-isopropylphenyl, 4-isopropylphenyl, 3-(1-methylbutyl) phenyl, 3-(1-ethylpropyl) phenyl, 3-t-amyl-6-chlorophenyl, 4-(1-ethylpropyl) phenyl, methoxyphenyl, butoxyphenyl, 2-nitrophenyl, 2-nitro-4-chlorophenyl, 4-methylthio-3-tolyl, 4-dimethylamino-3-tolyl, etc.

$R^1$ is hydrogen or alkyl of 1 to 4 carbon atoms, preferably $R^1$ is hydrogen, methyl or ethyl. Representative $R^1$ groups include, in addition to hydrogen, methyl and ethyl, the groups n-propyl, isopropyl, n-butyl and isobutyl.

$R^2$ is preferably alkyl of 1 to 6 carbon atoms substituted with 0 to 4 halogen atoms of atomic number 17 to 35, preferably 0 to 2 halogen atoms of atomic number 17 to 35, cycloalkyl of 3 to 6 carbon atoms substituted with 0 to 4 halogen atoms of atomic numbers 17 to 35, preferably 0 to 2 halogen atoms of atomic number 17 to 35. Still more preferably $R^2$ is alkyl of 1 to 4 carbon atoms substituted with 0 to 2 halogen atoms of atomic number 17 to 35, preferably chlorine.

$R^3$ is preferably hydrogen or alkyl of 1 to 6 carbon atoms substituted with 0 to 4 halogen atoms of atomic number 17 to 35, preferably 0 to 2 halogen atoms of atomic number 17 to 35, cycloalkyl of 3 to 6 carbon atoms substituted with 0 to 4 halogen atoms of atomic number 17 to 35, preferably 0 to 2 halogen atoms of atomic number 17 to 35. Still more preferably $R^3$ is hydrogen or alkyl of 1 to 4 carbon atoms substituted with 0 to 2 halogen atoms of atomic number 17 to 35, preferably chlorine.

Representative alkyl groups which $R^2$ and $R^3$ may represent are methyl, ethyl, n-propyl, isopropyl, n-butyl, isobutyl, pentyl, hexyl, heptyl, octyl, nonyl, decyl, 2-methylbutyl, 3-methylpentyl, cyclopentyl, cyclohexyl, cyclooctyl, chloromethyl, 2-chloroethyl, 3-chloropropyl, 4-chloroamyl, 6-chlorohexyl, 2,6-dichlorocyclohexyl, 2,6-dibromocyclohexyl, 3-bromocyclohexyl, bromomethyl, 2-bromoethyl, 3-bromopropyl, etc.

$R^2$ and $R^3$ may be joined to form a linear alkylene diradical of 3 to 5 carbon atoms which is bound to the carbonyl and nitrogen to form a ring. The carbamates in which $R^2$ and $R^3$ are joined to form a ring may be represented by the formula:

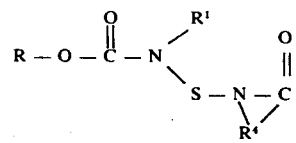

wherein $R^4$ is a linear alkylene of 3 to 5 carbon atoms, R and $R^1$ are as defined above.

Alkylene diradicals which $R^2$ and $R^3$ taken together or $R^4$ may represent are propylene, butylene and amylene.

Preferred compounds of the present invention will have R as phenyl, phenyl substituted with 1 to 4 alkyl groups of 1 to 5 carbon atoms or 1 to 4 alkoxy groups of 1 to 4 carbon atoms, nephthyl or naphthyl substituted with 1 to 4 alkyl groups of 1 to 5 carbon atoms or 1 to 4 alkoxy groups with 1 to 4 carbon atoms; $R^1$ as methyl and $R^3$ as hydrogen or methyl.

Representative compounds of the present invention include N-[(N'-methylformamido)thio]-1-naphthyl carbamate, N-[(N'-methylformamido)thio]-N-methyl- -naphthyl carbamate, N-[(N'-methylacetamido)thio]-N-methyl-1-naphthyl carbamate, N-[(N'-methylpropionamido)thio]-N-methyl-1-naphthyl carbamate, N-(N'-methylformamido)thio] phenyl carbamate, N-(N'-methylformamido)thio]-N-methyl phenyl carbamate, N-[(N'-methylacetamido)thio]-N-methyl phenyl carbamate, N-[(N'-methylformamido)thio]-N-methyl benzyl carbamate, N-[(N'-methylformamido)thio]-N-methyl 3-chlorophenyl carbamate, N-[(N'-methylformamido)thio]-N-methyl 2-nitrophenyl carbamate, N-(N'-methylformamido)thio]-N-methyl 3-methylphenyl carbamate, N-[(N'-methylformamido)thio]-N-methyl 2,4-dimethylphenyl carbamate, N-[(N'-methylformamido)thio]-N-methyl 3-ethylphenyl carbamate, N-[(N'-methylformamido)thio]-N-methyl 3-propylphenyl carbamate, N-[(N'-methylformamido)thio]-N-methyl 4-propylphenyl carbamate, N-[(N'-methylformamido)thio]-N-methyl 3-sec.-butylphenyl carbamate, N-[(N'-methylformamido)thio]-N-methyl 3-t-amyl-6-chlorophenyl carbamate, N-[(N'-methylformamido)thio]-N-methyl 3-(1-methylbutyl) phenyl carbamate, N-[(N'-methylformamido)thio]-N-methyl 3-(1-methylhexyl) phenyl carbamate, N-[(N'-methylformamido)thio]-N-methyl 3-(1ethylpropyl) phenyl carbamate, N-[(N'-methylformamido)thio]-N-methyl 3-t-amyl-6-bromophenyl carbamate, N-[(N'-methylformamido)thio]-N-methyl 3-(1-methylpentyl) phenyl carbamate, N-[(N'-methylformamido)thio]-N-methyl -sec.-butyl-6-chlorophenyl carbamate, N-[(N'-methylformamido)thio]-N-methyl 3-methoxyphenyl carbamate, N-[(N'-methylformamido)thio]-N-methyl -ethoxyphenyl carbamate, N-[(N'-methylformamido)thio]-N-methyl 3-butoxyphenyl carbamate, -[(N'-ethylacetamido)thio]-N-methyl 2-methylphenyl carbamate, N-[(N'-ethylacetamido)thio]-N-ethyl -chlorophenyl carbamate, N-[(N'-ethylformamido)thio]-N-butyl 3-sec.butylphenyl carbamate, N-[(N'-butylpropionamido)thio]-methylphenyl carbamate, N-[N'-methylformamido)thio]-N-ethyl-3-propylthiophenyl carbamate, N-[(N'-methylformamido)thio]-methyl-4-dipropylaminophenyl carbamate, etc.

The compound of the present invention may be made by reacting an aryl carbamate with a sulfenyl chloride, e., N-substituted acylamidosulfenyl chloride. The reaction proceeds according to the equation:

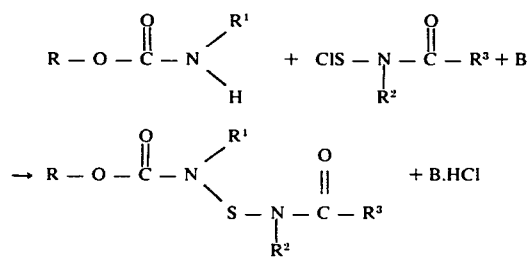

wherein B is an acid acceptor, R, R¹, R², and R³ are as defined previously. This reaction may be carried out in pyridine, dimethylformamide, methylene chloride, chloroform, acetonitrile and dimethoxyethane using an acid acceptor. Acid acceptors which may be used include the trialkylamines such as triethylamine, N-ethyl piperidine, and the heterocyclic amine bases such as pyridine, alkylpyridine, quinoline, etc. Triethylamine is the preferred acid acceptor.

The pressures and temperatures at which this reaction may be carried out are not critical. Temperatures ranging from ambient to about 60°C. will normally be used. However, lower temperatures or higher temperatures up to the decomposition temperature of the reactants and products may be used. For convenience, the pressure will usually be atmospheric or autogenous. However, subatmospheric or higher superatmospheric pressures may be used. The reaction will normally be complete within about 1 to 4 hours.

The carbamate reactants in the above equation may, and usually will, represent a commercial carbamate insecticide. Conventional methods for preparing such carbamates either in situ or beforehand may be used. Such reactants are disclosed in U.S. Pat. Nos. 3,062,707; 3,062,864; 3,062,865; 3,062,866; 2,903,478; 3,084,096; 3,208,853; 3,167,472 and 3,242,145 and *Pesticide Index*, 3rd edition, D. E. H. Frear (1965).

The sulfenyl chloride reactants used in the above reaction may be prepared by reacting sulfur dichloride with a monoalkylated amide (or a lactam). This reaction is illustrated by the following chemical equation

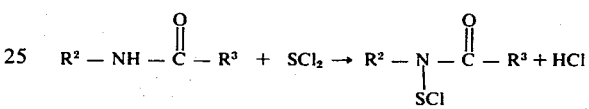

wherein $R^2$ and $R^3$ are as previously defined. It is desirable to use stoichiometric proportions of reactants or a slight excess of the sulfur dichloride reactant up to e.g., 4:1 mole ratio. The reaction temperature will generally not be critical and will usually range from −50° to 100°C. Likewise the pressure is not critical and will usually be atmospheric or autogenous. The reaction time generally will be from ½ to 5 hours. The reaction will generally be carried out in the presence of an inert solvent such as dichloromethane, diethylether, tetrahydrofuran, dimethylformamide, octane, acetonitrile and the like. Generally each reactant will be admixed separately with the solvent and then the mixture containing the amide and preferably a hydrogen halide acceptor will be added slowly with stirring to the mixture containing the sulfur dichloride. The amount of solvent should be equal to or up to 5 times the weight of the sulfur dichloride. Likewise the solvent for the amide-hydrogen halide acceptor mixture should be equal to or up to 5 times the weight of both.

The reaction of the sulfur dichloride and the monoalkylated amide or lactam is preferably carried out in the presence of a hydrogen halide acceptor. At least stoichiometric amounts of acceptor should be used. Soluble tertiary amines such as triethylamine, tributylamine, etc., or heterocyclic amine bases such as pyridine, alkylpyridine, etc., may be used. Pyridine is preferred.

The subject invention will be more fully appreciated by reference to the following examples.

EXAMPLE 1

15 g. of N-methyl 1-naphthyl carbamate and 7 ml. of pyridine were stirred in 100 ml. of methylene chloride as 11 g. of N-methyl formamidosulfenyl chloride was added slowly at room temperature. The resultant dark red solution was stirred at room temperature of 2 hours then diluted with 100 ml. of methylene chloride, washed with 100 ml. of water, 100 ml. saturated aqueous sodium bicarbonate solution and then again with 100 ml. of water. The solution was dried and stripped under vacuum yielding a viscous orange oil which was chromatographed on a silica gel column eluted with varying mixtures of ether and hexane to separate the desired product. Infrared and nuclear magnetic resonance spectra indicate the desired product was obtained, i.e. N-[(N'-methylformamido)-thio]-N-methyl 1-naphthyl carbamate. Element analysis was: S: Calculated 11.02%; Found 10.56%.

EXAMPLE 2

17.6 g. of N-methyl m-(sec.amyl)phenyl carbamate (the carbamate was actually mixed isomers of o, m, and p, (sec.amyl) phenyl carbamate containing approximately 60% of the active m isomer) and 7 g. of pyridine were dissolved in 100 ml. of methylene chloride and stirred while a solution of 10 g. of N-methylformamidosulfenyl chloride in 10 ml. of methylene chloride was added slowly at room temperature. After being stirred for 3 hours at room temperature, the solution was washed with 150 ml. of water, 100 ml. saturated aqueous sodium bicarbonate and then again with 100 ml. of water. After drying and solvent removal the product was chromatographed on a silica gel column eluted with varying mixtures of ether and hexane to separate the desired product from the reactants. The product obtained was primarily N-[(N'-methylformamido)thio]-N-methyl m-(sec.amyl)phenyl carbamate. The N-](N'-methylformamido)thio]-N-methyl o-(sec.amyl)phenyl carbamate and the N-[(N'-methylformamido)thio]-N-methyl p-(sec.amyl)phenyl carbamate were also present. The element analysis showed: S: Calculated 10.32%; Found 10.25%.

Using the general procedures of Examples 1 and 2, other N-[(N'-acylamido)thio] aryl carbamates of this invention were prepared. These compounds and analyses are tabulated below in Table I.

TABLE I

| Compound | S Calc. | Found | N Calc. | Found |
|---|---|---|---|---|
| *N-[(N'-methylformamido)thio]-N-methyl m-(sec.butyl)phenyl carbamate | 10.80 | 10.88 | — | — |
| N-[(N'-methylformamido)thio]-N-methyl 3-(2-propyl)phenyl carbamate | 11.38 | 11.63 | 9.93 | 9.45 |
| N-[(N'-methylformamido)thio]-N-methyl 3,4-dimethyl-phenyl-carbamate | 11.98 | 11.79 | 10.45 | 9.33 |
| N-[(N'-methylformamido)thio]-N-methyl 2-isopropoxyphenyl carbamate | 10.77 | 11.98 | 9.40 | 9.23 |
| N-[(N'-methylacetamido)thio]-N-methyl 1-naphthyl carbamate | 10.56 | 10.78 | 9.21 | 8.44 |
| *N-[(N'-methylacetamido)thio]-N-methyl m-(sec.butyl)phenyl carbamate | 10.33 | 9.68 | 9.03 | 8.45 |
| *N-[(N'-ethylformamido)thio]-N-methyl m-(sec.butyl)phenyl carbamate | 10.34 | 10.58 | 9.03 | 8.45 |
| *N-[(N'-methylbutyramido)thio]-N-methyl m-(sec.butyl)phenyl carbamate | 9.49 | 11.72 | 8.27 | 8.19 |

*Primary compound — the o and p-(sec.butyl)phenyl carbamate compounds were also present (as in Example 2)

The compounds of the subject invention find use as insecticides. Representative carbamates of the present invention were tested as follows to illustrate the insecticidal properties. The test results are reported in Table II.

Test Procedures

Aphids (*Aphis gossypii* Glover): An acetone solution of the candidate toxicant containing a small amount of nonionic emulsifier was diluted with water to 30 ppm. Cucumber leaves infested with aphids were dipped in the toxicant solution. Mortality readings were then taken after 24 hours.

German Cockroach (*Blattella germanica* L.): A 500 ppm acetone solution of the candidate toxicant was placed in a microsprayer (atomizer). A random mixture of anesthetized male and female roaches were placed in a container and 50 mg. of the above described acetone solution was sprayed on them. A lid was placed on the container. A mortality reading was made after 24 hours.

Cabbage Looper (*Trichoplusia ni*): An acetone solution of the candidate toxicant containing a small amount of nonionic emulsifier was diluted with water to 500 ppm. Cabbage leaf sections were dipped in the toxicant solution and dried. The sections were then infested with cabbage looper larvae. Mortality readings were taken after 24 hours.

TABLE II

| Compound | % Mortality Aphids | Cockroach | Cabbage Looper |
|---|---|---|---|
| N-[(N'-methylformamido)thio]-N-methyl 1-naphthyl carbamate | 100 | 100 | 100 |
| *N-[(N'-methylformamido)thio]-N-methyl m-(sec.butyl)phenyl carbamate | 95 | 100 | 98 |
| **N-[(N'-methylformamido)thio]-N-methyl m-(sec.amyl)phenyl carbamate | — | 100 | — |
| N-[(N'-methylformamido)thio]-N-methyl 3-(2-propyl)phenyl carbamate | 99 | 100 | 100 |
| N-[(N'-methylformamido)thio]-N-methyl 3,4-dimethylphenyl carbamate | 96 | 100 | — |
| N-[(N'-methylformamido)thio]-N-methyl 2-isopropoxyphenyl carbamate | 99 | 100 | — |
| N-[(N'-methylacetamido)thio]-N-methyl 1-naphthyl carbamate | 85 | 100 | — |
| *N-[(N'-methylacetamido)thio]-N-methyl m-(sec.butyl)phenyl carbamate | 85 | 100 | 50 |

*Primary compound - the o and p-(sec.butyl)phenyl carbamate compounds also present
**Primary compound - the o and p-(sec.amyl)phenyl carbamate compounds also present Certain compounds of the present invention were also tested for control of dock beetle larvae and saltmarsh caterpillars and were found to be very effective as, for exxample, N-[(N'-methylformamido)thio]-N-methyl 1-naphthyl carbamate exhibited 100% control or dock beetle larvae at a concentration of 40 ppm when applied to dockleaves and then infested with the larvae. Likewise N-[(N'-methylformamido)thio]-N-methyl 3(sec.-amyl)phenyl carbamate exhibited 100% control of saltmarsh caterpillars when applied at a concentration of 250 ppm to pinto bean leaves and then infested with saltmarsh caterpillars.

In addition to the specific formulations and application techniques described above, one or more of the carbamate derivatives of the invention may be applied in other liquid or solid formulations to the insects, their environment, or hosts susceptible to insect attack. For example, they may be sprayed or otherwise applied directly to plants or soil so as to effect control of insects coming into contact therewith.

Formulations of the compounds of this invention will comprise a toxic amount of one or more carbamate derivatives and a biologically inert carrier. Usually they will also contain a wetting agent. Solid carriers such as clay, talc, sawdust and the like may be used in such formulations. Liquid diluents which may be used with these compounds include water and aromatic solvents. In addition these formulations may contain other compatible pesticides, plant growth regulators, fillers, stabilizers, attractants and the like.

The concentration of the active ingredient to be used with inert carriers, either solid or liquid carriers, will be dependent upon many factors, such as the particulat carbamate compound which is used, the carrier in or upon which it is incorporated, the method and conditions of application, the insect species to be controlled, etc., the proper consideration of these factors being within the skill of those versed in the art. In general, the toxic ingredients of this invention will be effective in concentrations from about 0.0001 percent by weight to as high as 90 percent by weight or higher. Economically, of course, it is desirable to use lower concentrations of this active ingredient. Thus, it is usually desirable to use less than 20 percent by weight of the active ingredient in a particular composition.

The terms "insecticide" and "insect" as used herein refer to their broad and commonly understood usage rather than to those creatures which in the strict biological sense are classified as insects. Thus, the term "insect" is used not only to include small invertebrate animals belonging to the class Insecta but also to other related classes of arthropods whose members are segmented invertebrates having more or fewer than six legs, such as spiders, mites, ticks, centipedes, worms and the like.

As will be evident to those skilled in the art, various modifications on this invention can be made or followed, in the light of the foregoing disclosure and discussion, without departing from the spirit or scope of the disclosure or from the scope of the following claims.

We claim:
1. A method for killing insects which comprises contacting said insects with an insecticidally effective amount of a compound of the formula

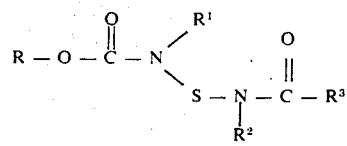

wherein R is hydrocarbon aryl of 6 to 14 carbon atoms substituted with 0 to 4 halogen atoms of atomic number 9 to 35, nitro groups, alkoxy groups of 1 to 7 carbon atoms, alkylthio of 1 to 3 carbon atoms or 0 to 1 dialkylamino in which the alkyl groups individually contain 1 to 3 carbon atoms; $R^1$ is hydrogen or alkyl of 1 to 4 carbon atoms; $R^2$ is alkyl of 1 to 10 carbon atoms substituted with 0 to 4 halogen atoms of atomic number 17 to 35 or cycloalkyl of 3 to 10 carbon atoms substituted with 0 to 4 halogen atoms of atomic number 17 to 35; and $R^3$ is hydrogen, alkyl of 1 to 10 carbon atoms substituted with 0 to 4 halogen atoms of atomic number 17 to 35 or cycloalkyl of 3 to 10 carbon atoms substituted with 0 to 4 halogen atoms of atomic number 17 to 35.

2. The method of claim 1 wherein R is phenyl; phenyl substituted with 1 to 4 halogen atoms of atomic number 9 to 35, nitro groups, alkyl groups of 1 to 7 carbon atoms, alkoxy groups of 1 to 7 carbon atoms, alkylthio of 1 to 3 carbon atoms or 0 to 1 dialkylamino in which the alkyl groups contain individually 1 to 3 carbon atoms; naphthyl or naphthyl substituted with 1 to 4 halogen atoms of atomic number 9 to 35, nitro groups, alkyl groups of 1 to 7 carbon atoms, alkoxy groups of 1 to 7 carbon atoms, alkylthio of 1 to 3 carbon atoms or 0 to 1 dialkylamino in which the alkyl groups contain individually 1 to 3 carbon atoms.

3. The method of claim 1 wherein R is phenyl; phenyl substituted with 1 to 4 alkyl groups of 1 to 5 carbon atoms or alkoxy groups of 1 to 4 carbon atoms; naphthyl or naphthyl substituted with 1 to 4 alkyl groups of 1 to 5 carbon atoms or alkoxy groups of 1 to 5 carbon atoms.

4. The method of claim 1 wherein $R^2$ is alkyl of 1 to 6 carbon atoms substituted with 0 to 4 halogen atoms of atomic number 17 to 35 or cycloalkyl of 3 to 6 carbon atoms substituted with 0 to 4 halogen atoms of atomic number 17 to 35 and $R^3$ is hydrogen, alkyl of 1 to 6 carbon atoms substituted with 0 to 4 halogen atoms of atomic number 17 to 35 or cycloalkyl of 3 to 6 carbon atoms substituted with 0 to 4 halogen atoms of atomic number 17 to 35.

5. The method of claim 1 wherein $R^2$ is alkyl of 1 to 4 carbon atoms substituted with 0 to 2 chlorine atoms and $R^3$ is hydrogen or alkyl of 1 to 4 carbon atoms substituted with 0 to 2 chlorine atoms.

6. The method of claim 1 wherein R is phenyl; phenyl substituted with 0 to 4 alkyl groups of 1 to 5 carbon atoms or alkoxy groups of 1 to 4 carbon atoms; or naphthyl; $R^1$ is methyl; $R^2$ is methyl; and $R^3$ is hydrogen or methyl.

7. The method of claim 1 wherein the compound is N-[(N'-methylformamido)thio]-N-methyl 1-naphthyl carbamate.

8. The method of claim 1 wherein the compound is N-[(N'-methylformamido)thio]-N-methyl m-(sec.-butyl)phenyl carbamate.

9. The method of claim 1 wherein the compound is N-[(N'-methylformamido)thio]-N-methyl m-(sec.-amyl)phenyl carbamate.

10. The method of claim 1 wherein the compound is N-[(N'-methylacetamido)thio]-N-methyl m-(sec.-butyl)phenyl carbamate.

11. A composition for killing insects which comprises an insecticidally effective amount of a compound of the formula $$R-O-\overset{O}{\underset{}{C}}-N\overset{R^1}{\underset{S-N-\overset{O}{\underset{}{C}}-R^3}{}}$$
$$\phantom{R-O-\overset{O}{\underset{}{C}}-N\overset{R^1}{\underset{S-N}{}}}\overset{}{\underset{R^2}{|}}$$

wherein R is hydrocarbon aryl of 6 to 14 carbon atoms substituted with 0 to 4 halogen atoms of atomic number 9 to 35, nitro groups, alkoxy groups of 1 to 7 carbon atoms, alkylthio of 1 to 3 carbon atoms of 0 to 1 dialkylamino in which the alkyl groups individually contain 1 to 3 carbon atoms; $R^1$ is hydrogen or alkyl of 1 to 4 carbon atoms; $R^2$ is alkyl of 1 to 10 carbon atoms substituted with 0 to 4 halogen atoms of atomic number 17 to 35 or cycloalkyl of 3 to 10 carbon atoms substituted with 0 to 4 halogen atoms of atomic number 17 to 35; and $R^3$ is hydrogen, alkyl of 1 to 10 carbon atoms substituted with 0 to 4 halogen atoms of atomic number 17 to 35 or cycloalkyl of 3 to 10 carbon atoms substituted with 0 to 4 halogen atoms of atomic number 17 to 35, and a biologically inert carrier.

12. The composition of claim 11 wherein R is phenyl; phenyl substituted with 1 to 4 halogen atoms of atomic number 9 to 35, nitro groups, alkyl groups of 1 to 7 carbon atoms, alkoxy groups of 1 to 7 carbon atoms, alkylthio of 1 to 3 carbon atoms or 0 to 1 dialkylamino in which the alkyl groups contain individually 1 to 3 carbon atoms; naphthyl or naphthyl substituted with 1 to 4 halogen atoms of atomic number 9 to 35, nitro groups, alkyl groups of 1 to 7 carbon atoms, alkoxyl groups of 1 to 7 carbon atoms, alkylthio of 1 to 3 carbon atoms or 0 to 1 dialkylamino in which the alkyl groups contain individually 1 to 3 carbon atoms.

13. The composition of claim 11 wherein R is phenyl; phenyl substituted with 1 to 4 alkyl groups of 1 to 5 carbon atoms or alkoxy groups of 1 to 4 carbon atoms; naphthyl or naphthyl substituted with 1 to 4 alkyl groups of 1 to 5 carbon atoms or alkoxy groups of 1 to 5 carbon atoms.

14. The composition of claim 11 wherein $R^2$ is alkyl of 1 to 6 carbon atoms substituted with 0 to 4 halogen atoms of atomic number 17 to 35 or cycloalkyl of 3 to 6 carbon atoms substituted with 0 to 4 halogen atoms of atomic number 17 to 35 and $R^3$ is hydrogen, alkyl of 1 to 6 carbon atoms substituted with 0 to 4 halogen atoms of atomic number 17 to 35 or cycloalkyl of 3 to 6 carbon atoms substituted with 0 to 4 halogen atoms of atomic number 17 to 35.

15. The composition of claim 11 wherein $R^2$ is alkyl of 1 to 4 carbon atoms substituted with 0 to 2 chlorine atoms and $R^3$ is hydrogen or alkyl of 1 to 4 carbon atoms substituted with 0 to 2 chlorine atoms.

16. The composition of claim 11 wherein R is phenyl; phenyl substituted with 0 to 4 alkyl groups of 1 to 5 carbon atoms or alkoxy groups of 1 to 4 carbon atoms; or naphthyl; $R^1$ is methyl; $R^2$ is methyl; and $R^3$ is hydrogen or methyl.

17. The composition of claim 11 wherein the compound is N-[(N'-methylformamido)thio]-N-methyl 1-naphthyl carbamate.

18. The composition of claim 11 wherein the compound is N-[(N'-methylformamido)thio]-N-methyl m-(sec.butyl)phenyl carbamate.

19. The composition of claim 11 wherein the compound is N-[(N'-methylformamido)thio]-N-methyl m-(sec.amyl)phenyl carbamate.

20. The composition of claim 11 wherein the compound is N-[(N'-methylacetamido)thio]-N-methyl m-(sec.butyl)phenyl carbamate.

* * * * *